United States Patent
Dunham et al.

(10) Patent No.: US 10,261,491 B1
(45) Date of Patent: Apr. 16, 2019

(54) METHOD AND APPARATUS FOR COORDINATING EXTERNAL DEVICE MOTION WITH MOTION OF INDEPENDENT MOVERS IN A LINEAR DRIVE SYSTEM

(71) Applicant: Rockwell Automation Technologies, Inc., Mayfield Heights, OH (US)

(72) Inventors: Jesse R. Dunham, Willoughby Hills, OH (US); Jatin P. Bhatt, Highland Heights, OH (US); Bhanu K. Gouda, Reminderville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/911,636

(22) Filed: Mar. 5, 2018

(51) Int. Cl.
| | |
|---|---|
| *G05D 1/00* | (2006.01) |
| *G05B 19/29* | (2006.01) |
| *B65G 47/71* | (2006.01) |
| *H02P 5/50* | (2016.01) |
| *H02P 25/064* | (2016.01) |

(52) U.S. Cl.
CPC .......... *G05B 19/298* (2013.01); *B65G 47/71* (2013.01); *G05D 1/0016* (2013.01); *H02P 5/50* (2013.01); *H02P 25/064* (2016.02); *G05B 2219/34206* (2013.01); *G05B 2219/41327* (2013.01)

(58) Field of Classification Search
CPC ....... B65G 47/71; B25J 9/1664; G05B 19/298
See application file for complete search history.

(56) References Cited

U.S. PATENT DOCUMENTS

| | | | | |
|---|---|---|---|---|
| 6,646,404 B2* | 11/2003 | Okuyama | ............... | B25J 9/1669 318/568.13 |
| 7,266,425 B2* | 9/2007 | Bhatt | ..................... | B25J 9/1658 318/568.19 |
| 7,386,367 B2* | 6/2008 | Watanabe | ............... | B25J 9/1612 700/245 |
| 7,529,599 B1* | 5/2009 | Bhatt | ..................... | B25J 9/1664 318/568.19 |
| 8,000,818 B1* | 8/2011 | Bhatt | ..................... | B25J 9/1664 700/17 |
| 8,000,838 B2* | 8/2011 | Bhatt | ..................... | B25J 9/1658 318/568.19 |
| 9,604,365 B2* | 3/2017 | Kanno | ................... | B25J 9/1697 |
| 9,958,852 B2* | 5/2018 | Bhatt | ..................... | G05B 19/19 |
| 2018/0170720 A1* | 6/2018 | Mannari | ................. | B66C 13/48 |

* cited by examiner

*Primary Examiner* — William R Harp
(74) *Attorney, Agent, or Firm* — Boyle Fredrickson, SC

(57) ABSTRACT

An improved system and method for coordinating motion between an external device and independent movers traveling along a linear drive system includes a motion controller generating motion commands for both the external device and for each of the independent movers. Coordinate systems are defined in the motion controller that correspond to a track along which each of the independent movers travels and to the external device. An offset between the coordinate systems is also defined. The motion controller receives a command for coordinated motion and generates motion commands for the independent mover and the external device in one coordinate system to achieve the commanded coordinated motion. The motion command that corresponds to the coordinate system in which the motion commands are generated are transmitted directly, and the motion command associated with the second coordinate system is first transformed to the second coordinate system using the offset.

19 Claims, 11 Drawing Sheets

| SEGMENT | GEOMETRY | LENGTH | RADIUS | ANGULAR DISTANCE | |
|---|---|---|---|---|---|
| 1 | CURVE | 2000 | 500 | 180 | |
| 2 | STRAIGHT | 1000 | 0 | 0 | |
| 3 | STRAIGHT | 1000 | 0 | 0 | |
| 4 | STRAIGHT | 1000 | 0 | 0 | |
| 5 | CURVE | 1000 | 500 | 90 | |
| N | | | | | |

METHOD AND APPARATUS FOR COORDINATING EXTERNAL DEVICE MOTION WITH MOTION OF INDEPENDENT MOVERS IN A LINEAR DRIVE SYSTEM

BACKGROUND INFORMATION

The subject matter disclosed herein relates to motion control systems and, more specifically, to a method and apparatus for coordinating motion of external devices with the motion of multiple independent movers traveling along a track in a linear drive system.

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

Traditionally, the location of a mover along the track is determined with respect to a linear position along the track. For a closed track, that is a track where "the end" of the track joins "the start" of the track such that a mover will repeatedly travel the length of the track when traveling in a single direction, the start of the track may be assigned a position, such as zero, which establishes a reference position. As the mover travels along the track, whether in a straight or curved path, the position along the track increases until the mover reaches the end of the track. When the mover transitions from the end back to the start, the position of the mover is reset to the initial, or reference, position. Thus, a single coordinate may be used to define a location of each mover along the track.

The single coordinate system is suitable for defining the location of movers along the track when a central controller need only coordinate the position of each mover with respect to the other movers. However, in certain applications, it may be desirable for an external device to engage or interact with a load present on the mover as the mover travels along the track. In order for the external device to interact with the mover, the motion of the mover must be coordinated with the motion of the external device.

Historically, coordination of motion between the external device and a mover has been limited. For example, the external device may be configured to travel in parallel to the mover. A sensor, position feedback information for the mover, or the like may indicate when the mover reaches a start position. A system controller may use the sensor or position feedback information to initiate travel of the external device in tandem with the mover. The external device may be, for example, a fill mechanism that dispenses product into a container on the mover as the mover travels. When a second sensor or subsequent position feedback information indicates the mover has reached an end position, the system controller may indicate to the external device to stop filling the container and return to the start position. This manner of motion coordination between a mover and an external device is, however, limited in the applications that may be performed to those that can match the linear travel of the mover.

Thus, it would be desirable to provide an improved system and method for coordinating motion between an external device and independent movers traveling along a linear drive system.

BRIEF DESCRIPTION

The subject matter disclosed herein describes an improved system and method for coordinating motion between an external device and independent movers traveling along a linear drive system. A motion controller generates motion commands for both the external device and for each of the independent movers. A first coordinate system is defined in the motion controller that corresponds to a track along which each of the independent movers travels. A second coordinate system is defined in the motion controller that corresponds to the external device. An offset between the first and the second coordinate system is defined in the motion controller. The motion controller receives a command for coordinated motion, requiring motion of at least one independent mover and the external device, and generates motion commands for the independent mover and the external device in one coordinate system to achieve the commanded coordinated motion. The motion command for either the mover or external device that corresponds to the coordinate system in which the motion commands are generated are utilized directly to control motion of the mover or external device. The motion command for the mover or external device associated with the second coordinate system is first transformed to the second coordinate system using the offset. The transformed motion command is then utilized to control motion of the mover or external device.

According to one embodiment of the invention, a method for coordinating motion between an external device and at least one mover in a linear drive system is disclosed, where the linear drive system includes a track having a plurality of segments. A first and a second coordinate system are defined in a motion controller. Each of the first and second coordinate systems correspond to either the external device or the track, and each of the external device and the track are defined by one of the coordinate systems. A coordinate system offset is stored in a memory of the motion controller. The coordinate system offset is an offset between the first coordinate system and the second coordinate system. A coordinated motion command for the external device is received at the motion controller, and the coordinated motion command identifies the at least one mover to move in tandem with the external device. First and second motion commands are generated at the motion controller from the coordinated motion command. The first motion command defines motion for the at least one mover in the first coordinate system, and the second motion command defines motion for the external device in the first coordinate system. A transformed motion command is generated at the motion controller by transforming either the first or second motion command to the second coordinate system in the motion controller as a function of the coordinate system offset. Operation of the external device and the at least one mover are controlled as a function of the transformed motion command and of the first or second motion command that was not transformed to the second coordinate system.

According to another embodiment of the invention, an apparatus for coordinating motion between an external device and at least one mover in a linear drive system is disclosed, where the linear drive system includes a plurality of segments. The apparatus includes a motion controller and multiple segment controllers. The motion controller includes a memory and a processor. The memory is operative to store a first coordinate system, a second coordinate system, a coordinate system offset between the first and second coordinate systems, and at least one control program. The processor is operative to execute the control program to receive a coordinated motion command for the external device and the at least one mover, generate a first motion command from the coordinated motion command defining motion for the at least one mover in the first coordinate system, generate a second motion command from the coordinated motion command defining motion for the external device in the first coordinate system, transform the second motion command from the first coordinate system to the second coordinate system as a function of the coordinate system offset, transmit the transformed second motion command to an external controller, where the external controller is operative to control the external device, and transmit the first motion command to a plurality of segment controllers. Each of the plurality of segment controllers is operative to drive the at least one mover along one of the plurality of segments.

According to still another embodiment of the invention, a method for coordinating motion between an external device and at least one mover in a linear drive system is disclosed, where the linear drive system includes a track having a plurality of segments. First and second coordinate systems are defined in a motion controller. The first coordinate system corresponds to the track, and the second coordinate system corresponds to the external device. A coordinate system offset is stored in a memory of the motion controller. The coordinate system offset is an offset between the first coordinate system and the second coordinate system. A coordinated motion command is received for the external device at the motion controller, and the coordinated motion command defines at least one mover to move in tandem with the external device. First and second motion commands are generated at the motion controller from the coordinated motion command. The first motion command defines motion for the at least one mover in the first coordinate system, and the second motion command defines motion for the external device in the first coordinate system. A transformed motion command is generated at the motion controller by transforming the second motion command to the second coordinate system in the motion controller as a function of the coordinate system offset. Operation of the at least one mover and of the external device is controlled as a function of the first motion command and of the transformed motion command.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
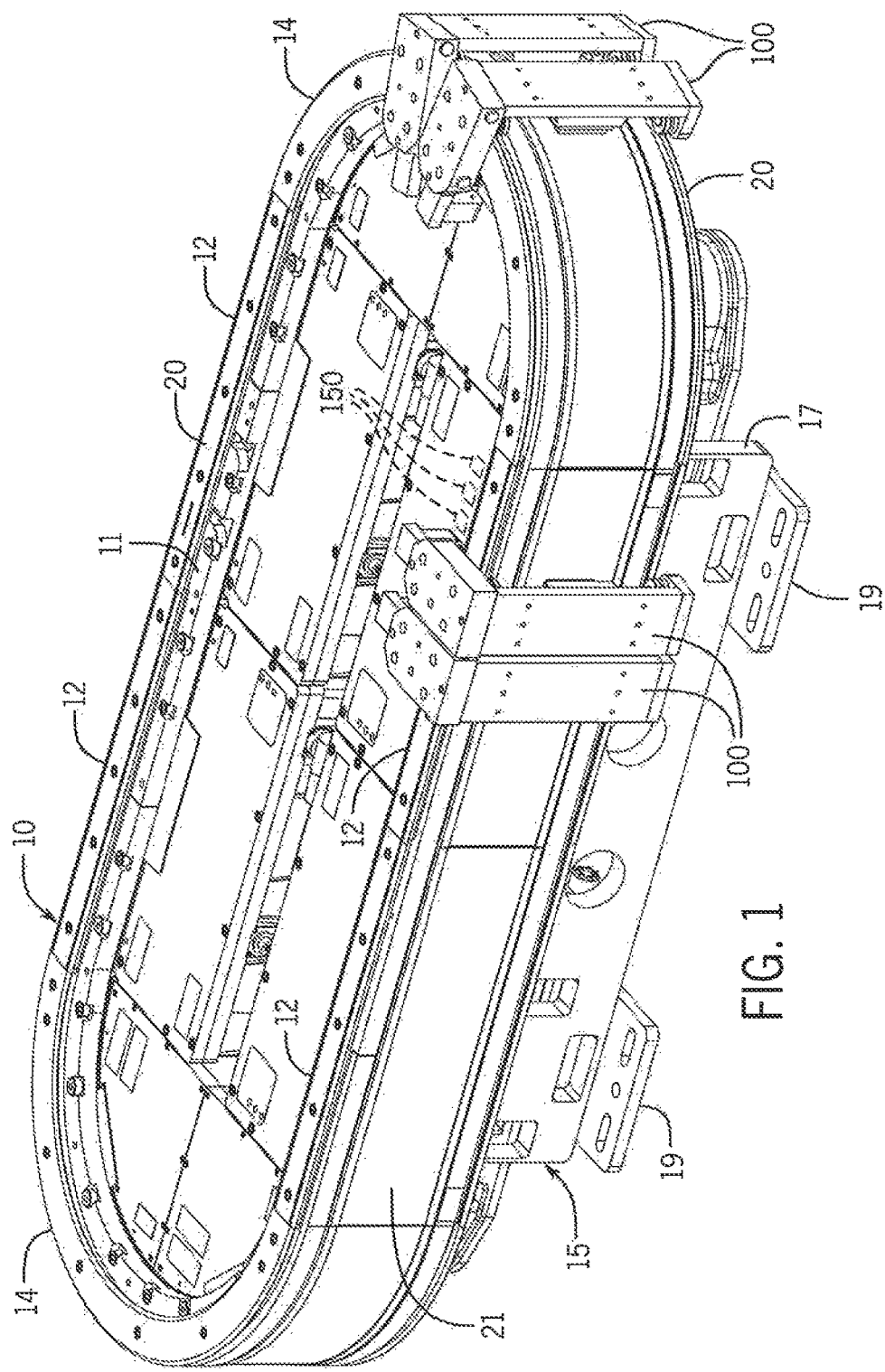
FIG. 1 is an isometric view of an exemplary transport system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12, 14. According to the illustrated embodiment, the segments define a generally closed loop supporting a set of movers 100 movable along the track 10. The track 10 is oriented in a horizontal plane and supported above the ground by a base 15 extending vertically downward from the track 10. According to the illustrated embodiment, the base 15 includes a pair of generally planar support plates 17, located on opposite sides of the track 10, with mounting feet 19 on each support plate 17 to secure the track 10 to a surface. The illustrated track 10 includes four straight segments 12, with two straight segments 12 located along each side of the track and spaced apart from the other pair. The track 10 also includes four curved segments 14 where a pair of curved segments 14 is located at each end of the track 10 to connect the pairs of straight segments 12. The four straight segments 12 and the four curved segments 14 form a generally oval track and define a closed surface over which each of the movers 100 may travel. It is understood that track segments of various sizes, lengths, and shapes may be connected together to form a track 10 and the track may include multiple branches or open-ended segments without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiment, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the width of the track 10 and span only a partial width of the surface of the track 10 on which it is attached. According to the illustrated embodiment and with reference also to FIG. 4, each rail 20 includes a base portion 22 mounted to the track segment and a track portion 24 along which the mover 100 runs. Each mover 100 includes complementary rollers 110 to engage the track portion 24 of the rail 20 for movement along the track 10.

Figure 3:
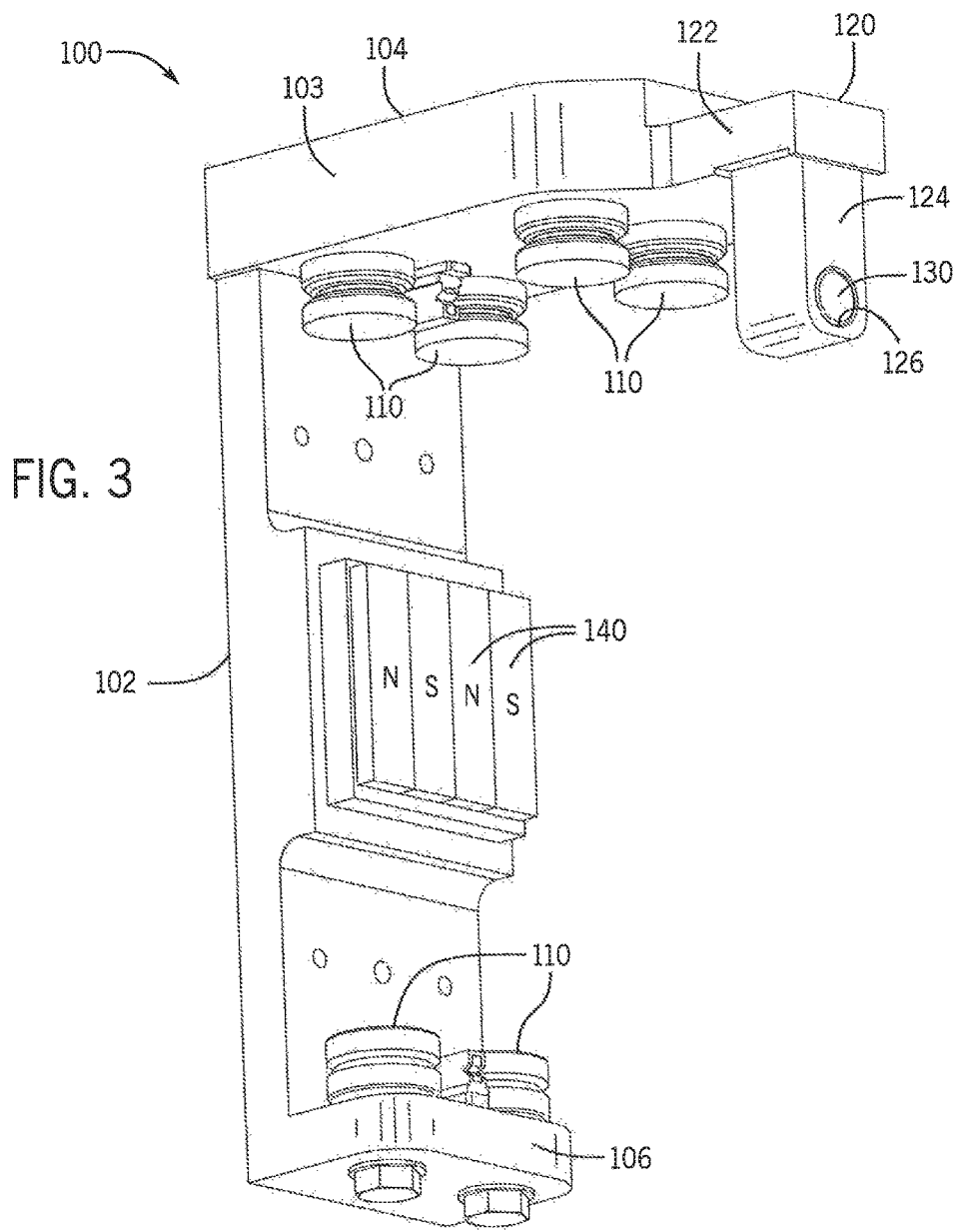
FIG. 3 is an isometric view of a mover from the transport system of FIG. 1.

One or more movers 100 are mounted to and movable along the rails 20 on the track 10. With reference next to FIG. 3, an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment.

Figure 2:
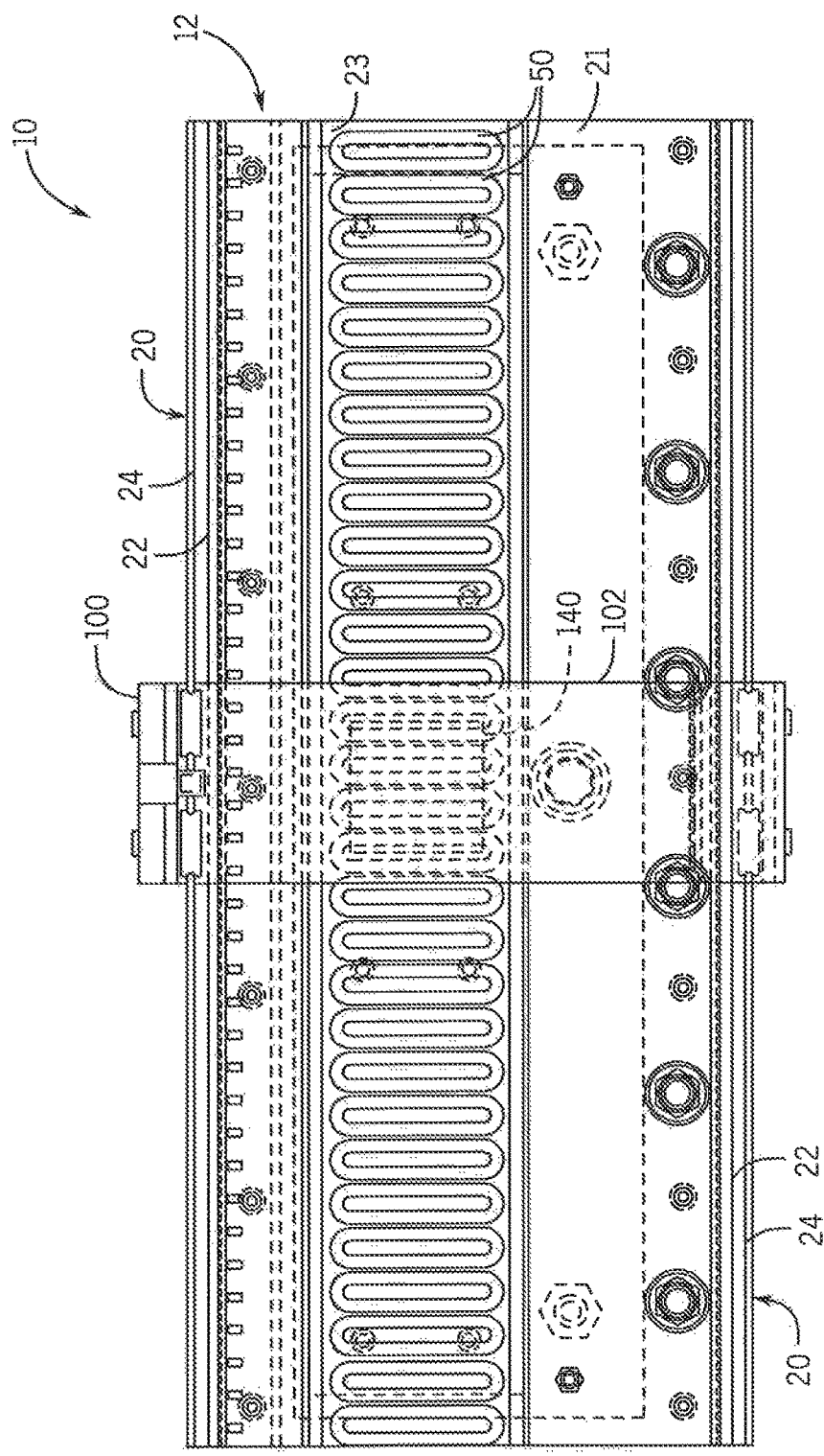
FIG. 2 is a partial side elevation view of one segment of one embodiment of the transport system of FIG. 1 illustrating activation coils distributed along one surface of the track segment.
Figure 4:
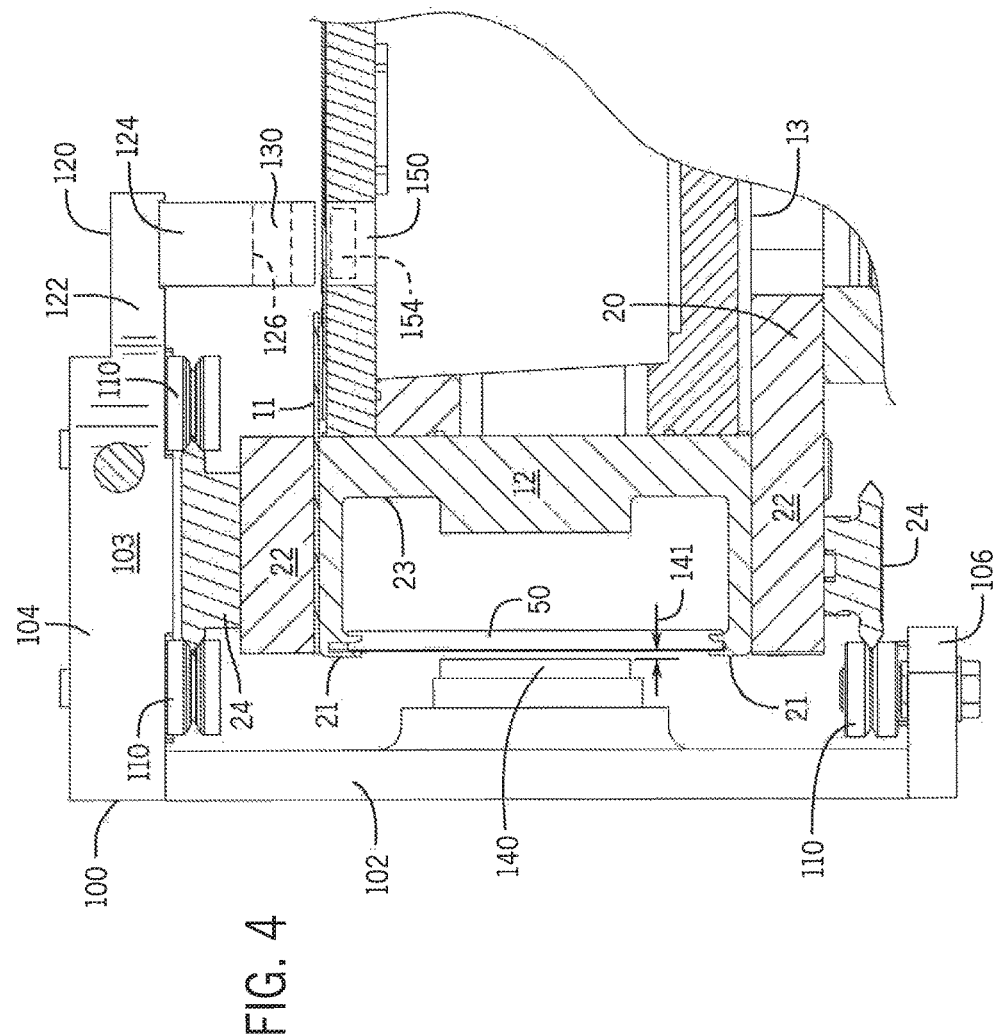
FIG. 4 is a partial sectional view of the transport system of FIG. 1.

A linear drive system is incorporated in part on each mover 100 and in part within each track segment 12, 14 to control motion of each mover 100 along the segment. According to one embodiment of the invention shown in FIG. 2, the linear drive system includes drive magnets 140 mounted to the side member 102. According to the illustrated embodiment, the drive magnets 140 are arranged in a block along an inner surface of the side member 102 with separate magnet segments alternately having a north pole, N, and south pole, S, pole facing the track segment 12. The drive magnets 140 are typically permanent magnets, and two adjacent magnet segments including a north pole and a south pole may be considered a pole-pair. The drive magnets 140 are mounted on the inner surface of the side member 102 and when mounted to the track 10 are spaced apart from a series of coils 50 extending along the track 10. As shown in FIG. 4, an air gap 141 is provided between each set of drive magnets 140 and the coils 50 along the track 10. On the track 10, the linear drive system includes a series of parallel coils 50 spaced along each track segment 12 as shown in FIG. 2. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 5:
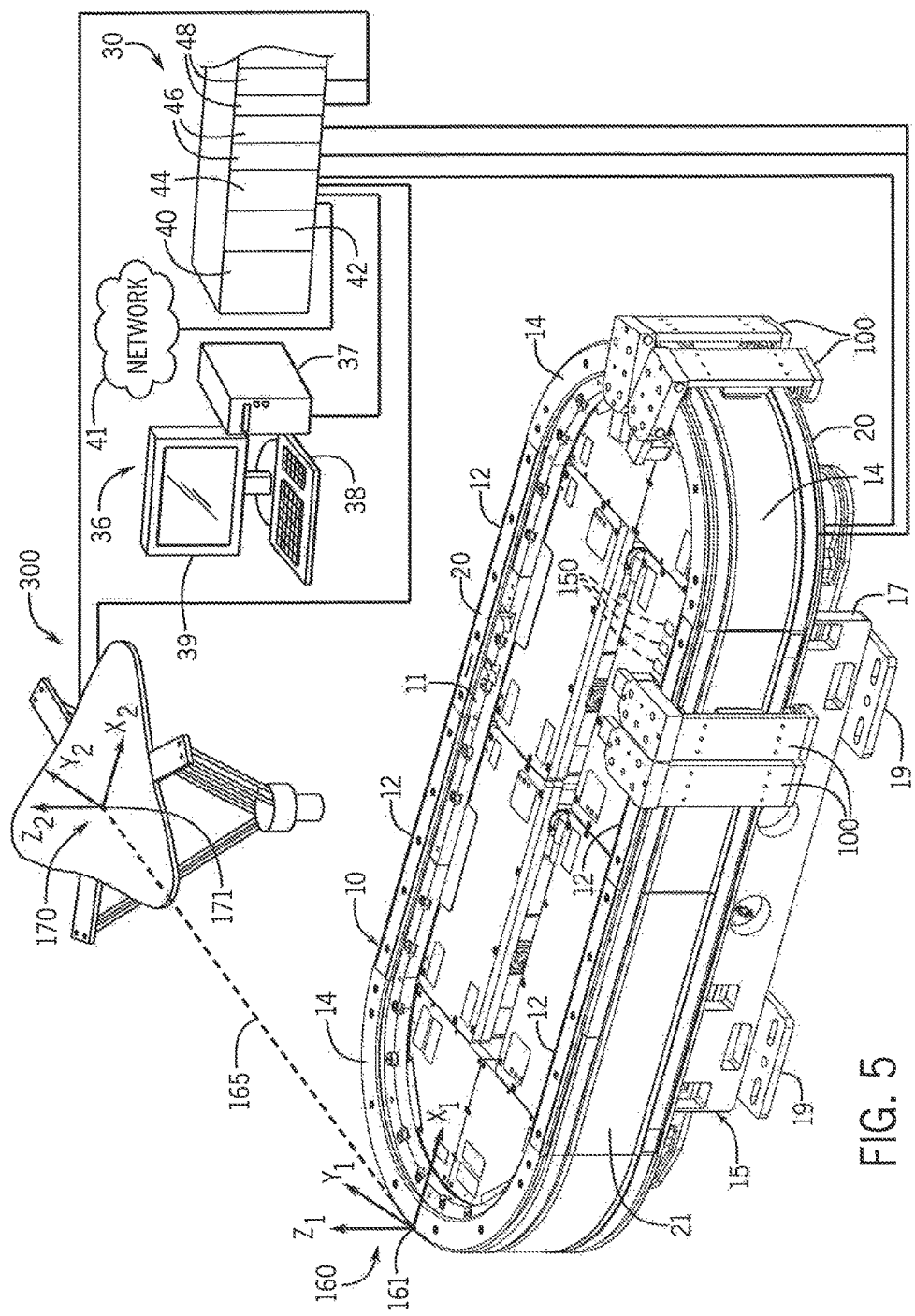
FIG. 5 is an exemplary application environment incorporating the transport system of FIG. 1 with an external robot operative to engage the transport system.

Turning next to FIG. 5, an exemplary application with a robot 300 which is operative to interact with the movers 100 as they travel along the track 10 is illustrated. A first coordinate system 160 is defined with respect to the track 10. The first coordinate system 160 is a Cartesian coordinate system with an origin 161 located at a predefined location along the track 10. The first coordinate system includes a first x-axis, $X_1$, a first y-axis, $Y_1$, and a first z-axis, $Z_1$ where each axis extends in a positive and negative direction from the origin 161. A second coordinate system 170 is defined with respect to the robot 300. The second coordinate system 170 is a Cartesian coordinate system with an origin 171 located at a predefined location on the robot 300. The second coordinate system includes a second x-axis, $X_2$, a second y-axis, $Y_2$, and a second z-axis, $Z_2$ where each axis extends in a positive and negative direction from the origin 171. An offset 165 exists between the origin 161 of the first coordinate system 160 and the origin 171 of the second coordinate system 170. It is contemplated that the offset 165 includes multiple components, including a component along each axis, defining a distance along the axis that the second origin 171 is displaced from the first origin 161. The offset 165 may further include a rotational component for each axis, defining an angle of rotation that exists between two corresponding axes in each coordinate system.

Figure 8:
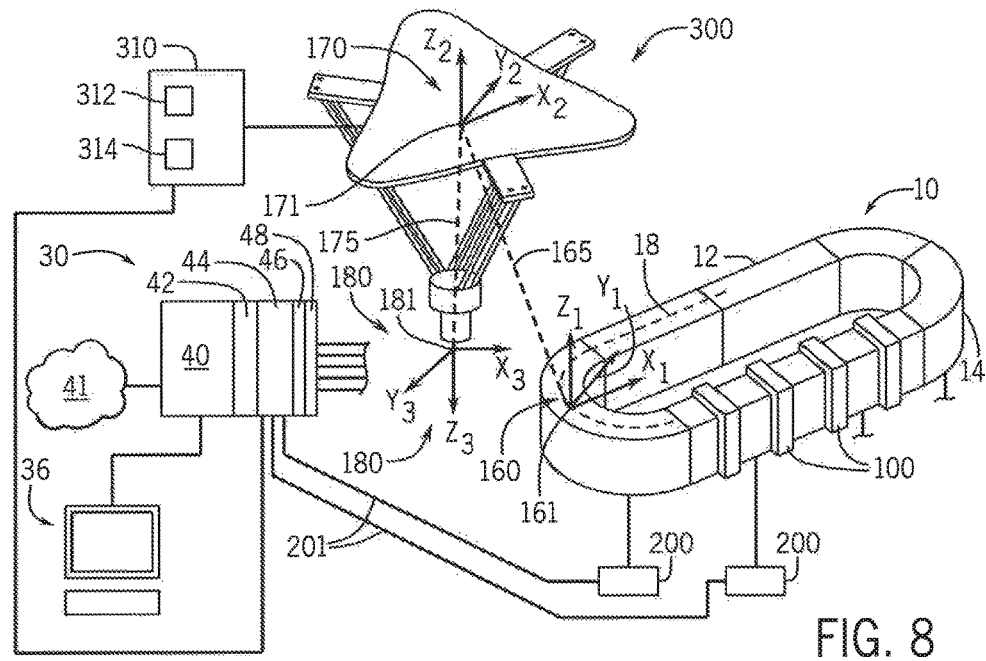
FIG. 8 is another exemplary application environment incorporating the transport system of FIG. 1 with an external robot operative to engage the transport system.
Figure 9:
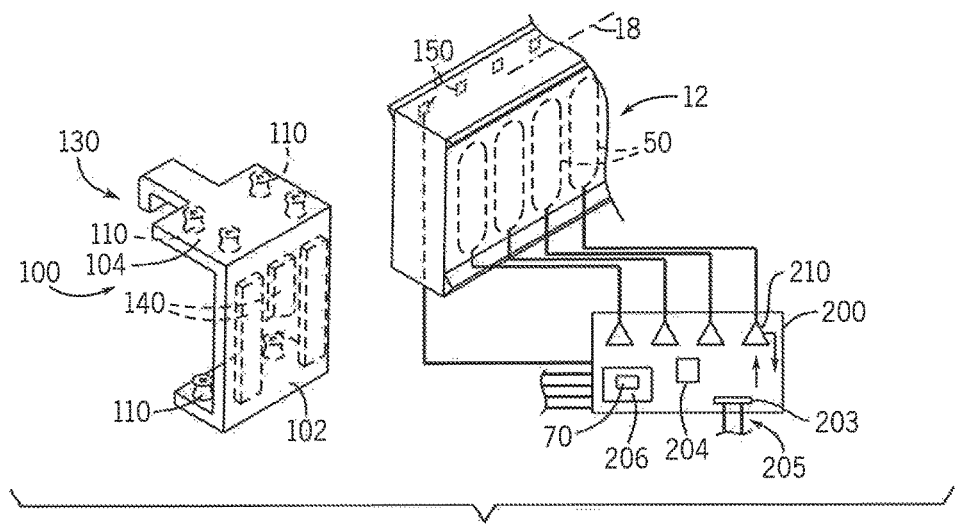
FIG. 9 is a partial exploded view of a mover and a segment of the transport system of FIG. 8 connected to a block diagram representation of a segment controller.

Referring still to FIG. 5, an exemplary system controller 30, which will be referred to herein also as a motion controller, controlling interaction between the robot 300 and movers 100 travelling along the track 10 is illustrated. The system controller 30 may be an industrial controller, referred to as a Programmable Logic Controller (PLC) or as a Programmable Automation Controller (PAC) or such as is commercially available from Rockwell Automation under the Logix tradename and may provide a power supply 40, a processor module 42, a communication module 44, and input or output (I/O) modules 46, 48. It is contemplated that the system controller 30 may include a single rack or multiple racks of modules. Further, various additional modules may be included according to an application's requirements. A backplane extends between modules within a rack and backplane connectors on each module connect a module to the backplane to receive power and/or for communication between modules. The processor module 42 includes a processor 64 and a memory device 66 (see FIG. 10). It is contemplated that the processor 64 and memory device 66 may each be a single electronic device or formed from multiple devices. The processor 64 may be a microprocessor. Optionally, the processor 64 and/or the memory device 66 may be integrated on a field programmable array (FPGA) or an application specific integrated circuit (ASIC). The memory device may include volatile memory, non-volatile memory, or a combination thereof. The network module 44 facilitates connections to devices, remote racks, and/or other controllers located remotely from the system controller 30. Network medium connect the network module, for example, via an Ethernet connection to a network 41. The connection to the network may be made directly or via a network device, such as a gateway, a router, a switch, and the like. The network may be an intranet, the Internet, or a combination thereof. An industrial network 201 (see FIG. 6) such as DeviceNet, Ethernet I/P, ControlNet, and the like may connect the network module 44 to other devices in the controlled system. With reference also to FIG. 8, the network module 44 is connected to a user interface 36, segment controllers 200 on the track 10, and an external controller 310 for the robot 300. A first set of I/O modules 46 are connected between the system controller 30 and the track 10. A second set of I/O modules 48 may be connected between the system controller 30 and the robot 300. Each of the I/O modules 46, 48 may connect or disconnect from the backplane 60 through a releasable electrical connector and may provide for one or more releasable terminals such as screw terminals or other electrical connectors allowing interconnection of the I/O modules to conductors communicating with the segment controllers 200 or the robot 300. In addition, each I/O module 46, 48 may include a processor 43, 47 and electronic memory 45, 49 (see FIG. 10).

The user interface 36 is provided for an operator to configure the system controller 30 and to load or configure desired motion profiles for the movers 100 on the system controller 30. The user interface 36 may include a processing unit 37, input device 38, including, but not limited to, a keyboard, touchpad, mouse, trackball, or touch screen, and a display device 39. It is contemplated that each component of the user interface 36 may be incorporated into a single unit, such as an industrial computer, laptop, or tablet computer. It is further contemplated that multiple display devices 39 and/or multiple input devices 38 may be distributed about the controlled machine or process and connected to one or more processing units 37. It is contemplated that still other combinations of computing devices and peripherals as would be understood in the art may be utilized or incorporated into the system controller 30 and user interface 36 without deviating from the scope of the invention.

Figure 6:
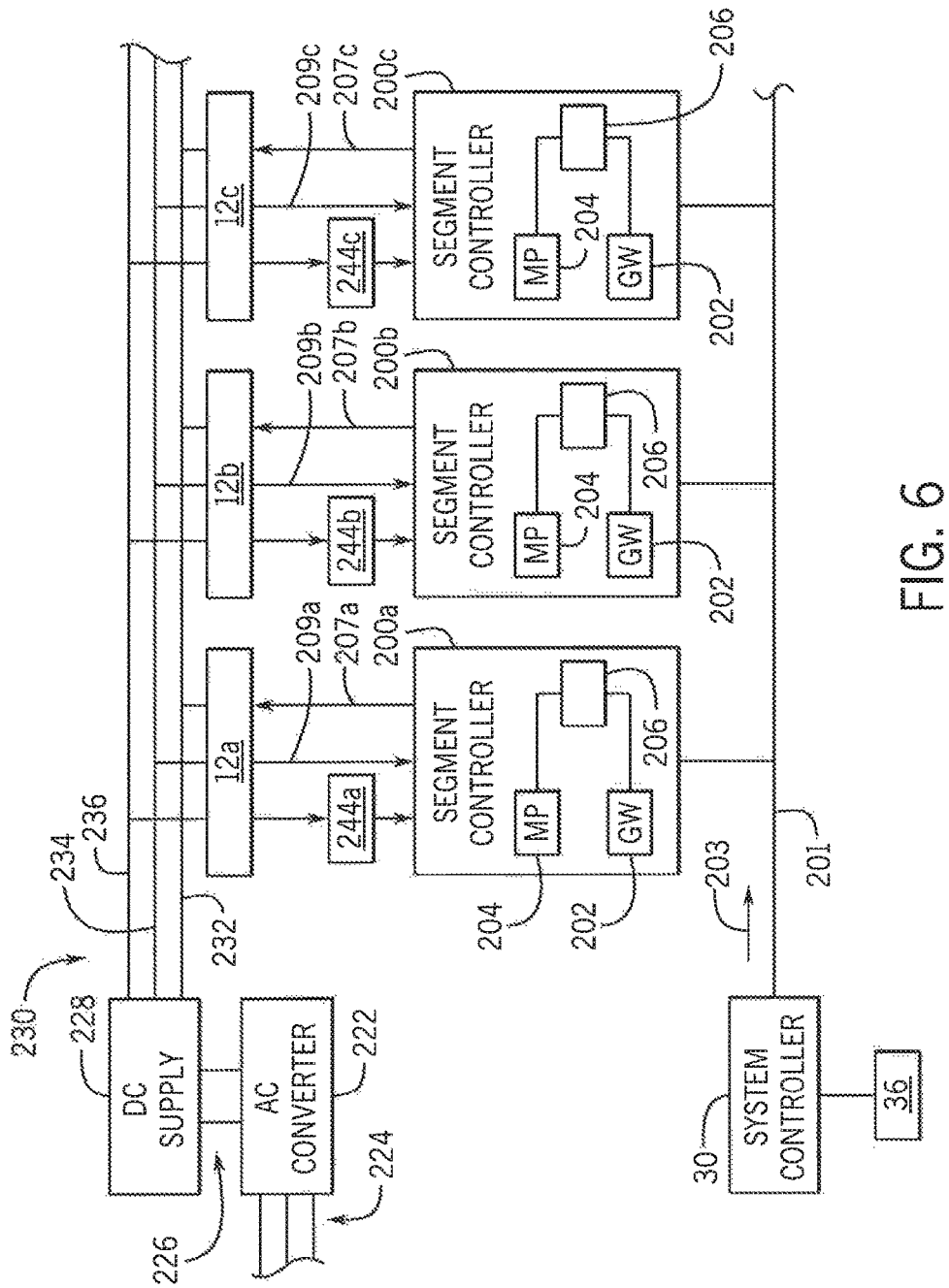
FIG. 6 is a block diagram representation of an exemplary power and control system for the transport system FIG. 1.

Turning next to FIG. 6, an exemplary power and control system for the track 10 and linear drive system is illustrated. A segment controller 200 is mounted within each track segment 12. The segment controller 200 receives motion command signals 203 from the system controller 30 and generates switching signals for power segments 210 (FIG. 7) which, in turn, control activation of each coil 50. Activation of the coils 50 are controlled to drive and position each of the movers 100 along the track segment 12 according to the command signals 203 received from the system controller 30.

A gateway 202 in each segment controller 200 receives the communications from the system controller 30 and passes the communication to a processor 204 executing in the segment controller 200. The processor may be a microprocessor. Optionally, the processor 204 and/or a memory device within the segment controller 200 may be integrated on a field programmable array (FPGA) or an application specific integrated circuit (ASIC). It is contemplated that the processor 204 and memory device 206 may each be a single electronic device or formed from multiple devices. The memory device 206 may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12 controlled by that system controller 30.

Figure 7:
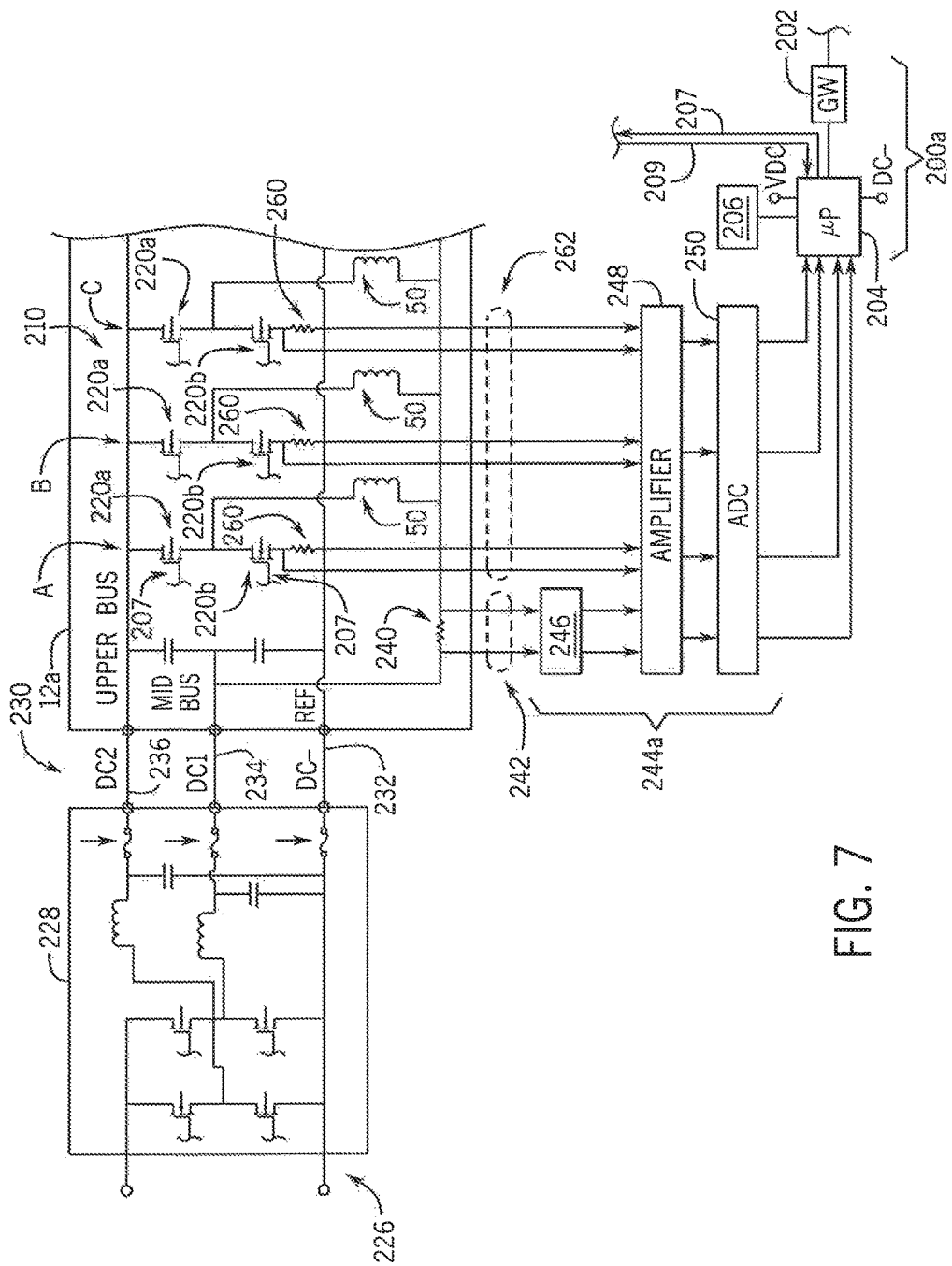
FIG. 7 is an exemplary schematic for a portion of the power and control system of FIG. 6.

With additional reference to FIG. 7, each segment controller 200 generates switching signals 207 to control operation of switching devices within one or more power segments 210 mounted within the track segment 12. The switching devices within each power segment 210 are connected between a power source and the coils 50. The switching signals are generated to sequentially energize coils 50 along a track segment, where the energized coils 50 create an electromagnetic field that interacts with the drive magnets 140 on each mover 100 to control motion of the movers 100 along the corresponding track segment 12. The switching signals 207 control operation of switching devices 220 in communication with the drive coils 50, including upper switch devices 220a and lower switching devices 220b. The switching devices 220 may be solid-state devices that are activated by the switching signals 207, including, but not limited to, transistors, such as insulated-gate bipolar transistors (IGBTs) or metal-oxide semiconductor field-effect transistors (MOSFETs), thyristors, or silicon-controlled rectifiers.

According to the illustrated embodiment, an AC converter 222 (FIG. 6) can receive a single or multi-phase AC voltage 224 from a power grid. The AC converter 222, in turn, can provide a DC voltage 226 using, for example, a rectifier front end, at input terminals of a DC supply 228, which could be a DC-to-DC buck converter. The DC supply 228, in turn, can provide a distributed DC bus 230 at the input terminals of the segments 12, including: a DC reference voltage rail 232, configured to provide a DC reference voltage ("DC-") such as ground (0 V); a mid-bus DC voltage rail 234, configured to provide half DC power at a mid-bus voltage ("DC 1") such as 200 V; and a full-bus DC voltage rail 236, configured to provide DC power at a full-bus voltage ("DC 2"), such as 400 V. Although illustrated external to the track segment 12, it is contemplated that the DC bus 230 would extend within the segments 12. Each segment 12 includes connectors to which either the DC supply or another track segment may be connected such that the DC bus 230 may extend for the length of the track 10. Optionally, each track segment 12 may be configured to include a rectifier section (not shown) and receive an AC voltage input. The rectifier section in each track segment 12 may convert the AC voltage to the DC bus 230 utilized by the corresponding track segment. It is contemplated that the polarities and magnitudes of the various rails of the DC bus 230 may vary within the scope of the invention.

The processor 204 also receives a feedback signal 209 from the position sensors 150 along the track segments 12, 14 to provide an indication of the presence of one or more movers 100. In each power segment 210, the processor 204 can generate the switching signals 207 to control the various switching devices 220 to provide power to respective coils 50 for propelling a mover 100 while continuously receiving feedback signals for determining positions of the mover 100. For example, in a first leg "A," the processor 204 can drive the upper and lower switching devices 220a and 220b, respectively, to control a corresponding coil 50 in the first leg A to propel the mover 100. The processor 204 can detect movement of the mover 100 from the first leg A toward an area corresponding to the second leg "B" via the feedback signals from the position sensors 150. The processor 204 can then drive the upper and lower switching devices 220a and 220b, respectively, to control a corresponding coil 50 in the second leg B to continue propelling the mover 100, according to a predetermined motion profile. In each leg, the lower switching devices 220b can be coupled to the DC-voltage rail 232, the upper switching device 220a can be coupled to the full-bus DC voltage rail 236, and the coil 50 can be coupled between the upper and lower switching devices 220a and 220b, respectively, on a first side and the mid-bus DC-voltage rail 234 on a second side. Accordingly, the switching devices 220 in each leg can be configured to connect a coil 50 in the leg between rails of the DC bus 230 in various states, such as the upper switching devices 220a connecting or disconnecting full-bus DC voltage rail 236 to a coil 50 causing positive current flow in coil 50, and/or the lower switching device 220b connecting or disconnecting DC-voltage rail 232 to a coil 50 causing negative current flow in coil 50.

The processor 204 receives feedback signals from voltage and/or current sensors mounted at an input or output of the power segment 210 providing an indication of the current operating conditions of the DC bus 230 within the power segment 210 or the current operating conditions of a coil 50 connected to the power segment 210, respectively. According to the illustrated embodiment, sensing resistors 260 are shown between lower switching devices 220b and the DC-reference voltage rail 232 to detect current through the lower switching devices. Signals from either side of the sensing resistors are provided to the signal conditioning circuitry 244. Similarly, a bus sensing resistor 240 is shown in series with the mid-bus DC-voltage rail 234. Signals from either side of the bus sensing resistor 240 are provided to the signal condition circuitry 244 through an isolation circuit 246. The signals are provided via an amplifier 248 and an Analog-to-Digital Converter (ADC) 250 to the processor 204 to provide a measurement of the current flowing through each of the sensing resistors 260 and the bus sensing resistor 240. It is contemplated that still other sensing resistors or other current transducers and voltage transducers may be located at various locations within the power segment 210 to provide current and/or voltage feedback signals to the processor 204 corresponding to current and/or voltage levels present on any leg of the DC bus 230 or at the output to any of the coils 50 connected to the power segment 210.

In operation, the motion controller 30 receives a coordinated motion command and is operative to generate motion commands for both the movers 100 along the track 10 and an external device, such as the illustrated robot 300, in a single coordinate system. It is contemplated that the coordinated motion command may be, for example, a single instruction in a control program executing on the motion controller 30. Optionally, the coordinated motion command may be two or more instructions in the control program configured to generate motion of a mover 100 and an external device in tandem with each other. The selected coordinate system, preferably corresponds to either the first coordinate system 160 or the second coordinate system 170. Generating an initial motion command for both the movers 100 and the robot 300 in a single coordinate system facilitates coordination of motion between the movers 100 and the robot 300. After generating the initial command, the system controller 30 utilizes the offset 165 between the first coordinate system 160 and the second coordinate system 170 to transform the initial motion command from one coordinate system to the other coordinate system. The transformed motion command is sent to the segment controllers 200 when the track coordinate system is the transformed coordinate system and to the robot controller when the robot coordinate system is the transformed coordinate system.

Figure 10:
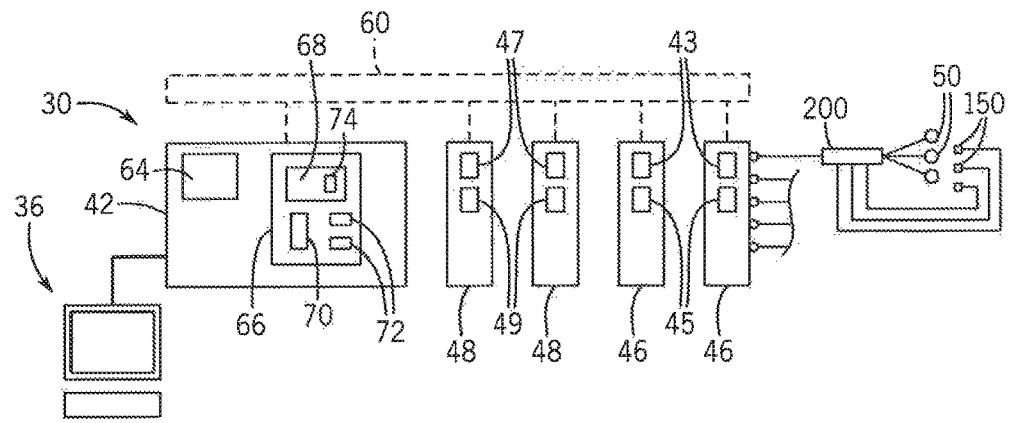
FIG. 10 is a partial block diagram representation of one embodiment of a system controller for the transport system.

Referring now to FIG. 10, the processor module 42, also attached to the backplane 60, may include one or more processor cores 64 communicating with electronic memory 66, the latter holding an operating program 68 as will be discussed below. The operating program 68 may include a coordination subsystem 74 implemented in firmware and/or hardware in the processor module 42 or implemented as a separate module insertable into the rack and connected to the backplane 60 for communication with the processor module. The electronic memory 66 may also hold various data files 72 including, for example, configuration files and data files.

The electronic memory 66 may also hold one or more additional industrial control programs 70 executable on the processor 64. The control programs 70 may be prepared using a standard industrial control language and describe a desired operation of one or more movers 100 along the track 10 in coordination with the robot 300. Industrial control programs 70 will typically be prepared for a particular application, for example, off-line using a standard desktop computer.

Figure 11:
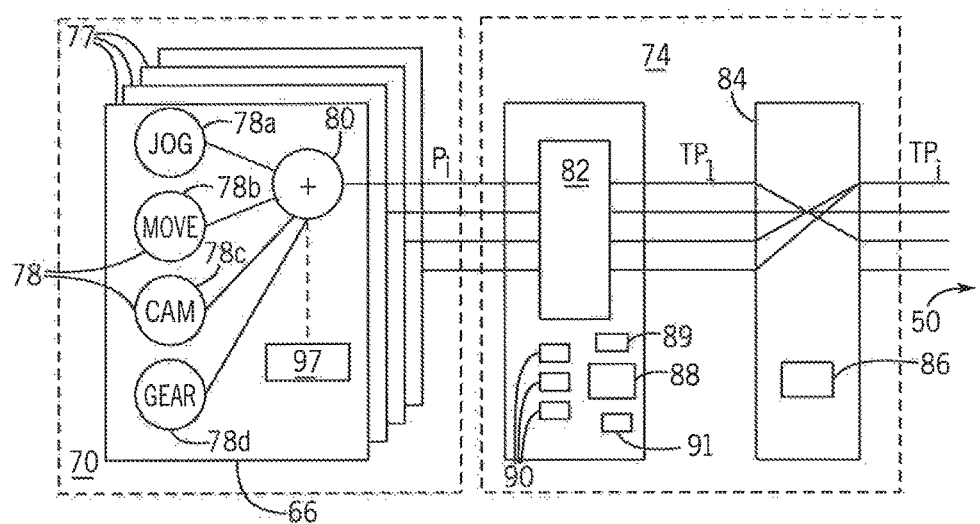
FIG. 11 is a block diagram representation of a control program and a motion coordination subsystem executing on the system controller of FIG. 10.

Referring now to FIGS. 10 and 11, the system controller 30, or motion controller, may be configured to generate motion commands for the movers 100 and the robot 300. Each control program 70 is constructed of instructions including, for example, movement instructions 77 which generate motion command signals, $P_i$, referenced to one of the coordinate systems 160, 170 and describing desired movement of the movers 100 along the track 10 and/or movement of different axes of the robot 300.

Generally, the motion instructions 77 may be represented as a set of nodes 78 each providing a different expression of motion control. The node 78 may include, for example, a jog node 78*a* that when activated in the control program 70 provides for a brief movement motion of the mover 100 and/or robot 300 of predetermined velocity and duration, for example, allowing it to be manually manipulated for positioning or the like. The motion instructions 77 may alternatively or in addition provide a command node 78*b* providing a point-to-point movement of the mover 100 and/or robot 300 from an arbitrary given location in one of the coordinate systems to a second location in the coordinate system. In addition or alternatively, the motion instructions 77 may provide a cam node 78*c* defining a simple cyclic motion of the mover 100 and/or robot 300, for example, as if driven by a mechanical cam, according to a predefined cam profile. Likewise, a gear node 78*d* may define linkage of movement of a mover 100 and/or robot 300 to another movement signal as if a gear or shaft connected those two movements.

The motion controller 30 may sum the outputs from each of these nodes 78 by an axis adder 80 to provide the motion command signals, $P_i$, consisting of a set of values (indexed by i) describing the desired motion of a given mover 100 or axis of the robot 300 over time. Different motion command signals, $P_i$, will generally be provided by different instructions 77 for each mover 100 or for the robot 300. For example, a first motion command, $P_1$, may be provided to a mover 100, and a second motion command, $P_2$, may be provided to the robot 300.

It is further contemplated, that the motion controller 30 may utilize a single motion instruction 77 to generate coordinated motion between a mover 100 and the robot 300. The motion instruction may generate motion command signals, $P_i$, for each mover 100 participating in the coordinate motion and for the robot 300, where a desired coordination of movement between the commanded mover(s) and the robot 300 is desired.

These motion command signals, $P_1$, will then be received by coordination subsystem 74 separate from the control programs 70, for example, being part of the firmware of the motion controller 30 and shared by all control programs 70, for example, as instanced objects. The coordination subsystem 74 need not be prepared by the programmers of the control program 70 and simplifies the programming of the mover(s) 100 and/or robot 300 in the control program 70 by moving tasks such as collision avoidance and cluster movement into a unitized framework outside of the control program 70 without duplication in the control program 70.

The coordination subsystem 74 converts the command movement signals, $P_i$, to transformed motion command signals, $TP_i$ that control the coordinated movement between the mover(s) 100 and the robot 300. This conversion process utilizes one or more coordinate transformations. The initial command position signals, Pi, may be generated in a single coordinate system. The initial coordinate system may be defined by the programmer during development of the control programs 70 for the system controller. It is contemplated that the initial coordinate system may be selected as either the first coordinate system 160 associated with the track or the second coordinate system 170 associated with the robot 300. Alternately, any other coordinate system in which the initial move commands are to be provided may be used.

The coordination subsystem 74 may utilize one or more configuration files (88-91) to perform the coordinate transforms. A coordinate transformer 82 receives each of the command movement signals, $P_1$, referenced to the initial coordinate system and then accesses each of the stored configuration files. According to the illustrated embodiment, the coordination subsystem 74 includes a first coordinate system configuration file 88, which defines the relationship of the first coordinate system 160 to the initial coordinate system; a second coordinate system configuration file 89, which defines the relationship of the second coordinate system 170 to the initial coordinate system; separate mover configuration files 90, which define the relationships of any mover offsets 95 (if present and as will be discussed in more detail below); and a track layout file 91, which defines the linear arrangement of the track 10. It is contemplated that still other configuration files, not shown, may be provided and which may include, but are not limited to, tool configuration files, fixture configuration files, or workpiece configuration files.

The relationship stored in each configuration file defines a relationship between the coordinate system or another point, such as the top or side of a mover, and one of the coordinate systems. For each coordinate system, the relationship stored in the configuration file may be an offset between the origin of the coordinate system corresponding to the configuration file and the origin of the initial coordinate system. For example, if the initial coordinate system is defined as the first coordinate system 160, the first coordinate system configuration file may set all offset values to zero, indicating that the origin 161 of the first coordinate system 160 is equal to the origin of the initial coordinate system. The second coordinate system configuration file may set offset values equal to the offset 165 between the origin 161 of the first coordinate system 160 and the origin 171 of the second coordinate system 170. It is contemplated that the offset 165 includes multiple components, including a component along each axis, defining a distance along the axis that the second origin 171 is displaced from the first origin 161. The offset 165 may further include a rotational component for each axis, defining an angle of rotation that exists between two corresponding axes in each coordinate system.

In other instances, the configuration file may define a relationship between another point, for example, on a mover 100 or on the robot 300 and one of the coordinate systems. The point may be, for example, a location on the top of the mover 100 or on the side of the mover 100 at which an action is to be performed and which may change between different movers 100 traveling along the track 10. Additionally, a mover 100 may include a workpiece or a tool which is either permanently affixed or removably affixed to the mover 100. An offset 95 may be defined for a point on the workpiece, the tool, or a combination thereof at which the robot 300 is to interact. It is contemplated that the configuration file 90 may include multiple offsets 95 where each offset corresponds to a different offset, such as a first offset for a work offset and a second offset for a tool offset, or the configuration file 90 may include a single offset 95 defining a point of interaction based on the combination of workpiece and tool present on the mover 100. The point of interaction may similarly be affected, for example, by the end of a tool inserted into the robot 300 and which may change based on the particular tool inserted. Rather than defining a relationship between the point on the mover 100 or between the point on the robot 300 and the initial coordinate system, the configuration file may define a relationship between the point and one of the other coordinate systems. The relationship may be defined when the mover 100 or the tool is at an initial or home position and may define an offset between the point on the mover and the origin 161 of the first coordinate system 160 and between the point on the robot 300 and the second coordinate system 170. It is contemplated that the defined offset may include multiple components, including a component along each axis, defining a distance along the axis that the point is displaced from the origin of the corresponding coordinate system.

The coordinate transformer 82 may utilize one or more configuration files to transform an initial motion command signal, $P_i$, to a transformed motion command signal, $TP_i$. According to an exemplary move, coordinated motion may be commanded between a point on or a path across the mover 100 and a tool on the robot 300. The initial coordinate system may be defined as the first coordinate system 160 corresponding to the track 10. As a result, a command position signal, $P_i$, for the mover 100 may be given in coordinates corresponding to the track 10. The coordinate transformer 82 may not need to make any further transformation to achieve the transformed motion command signal, $TP_i$, for the mover. However, the coordinate transformer 82 similarly receives an initial command for the robot 300 in the first coordinate system 160. Because the controller for the robot 300 operates in the second coordinate system 170, the coordinate transformer 82 reads the second coordinate system configuration file 89 to obtain the offset 165 between the first and second coordinate systems in order to transform the command position signal, $P_i$, for the external device (i.e., the robot 300) from the first coordinate system 160 to the second coordinate system 170.

Figures 12, 13:
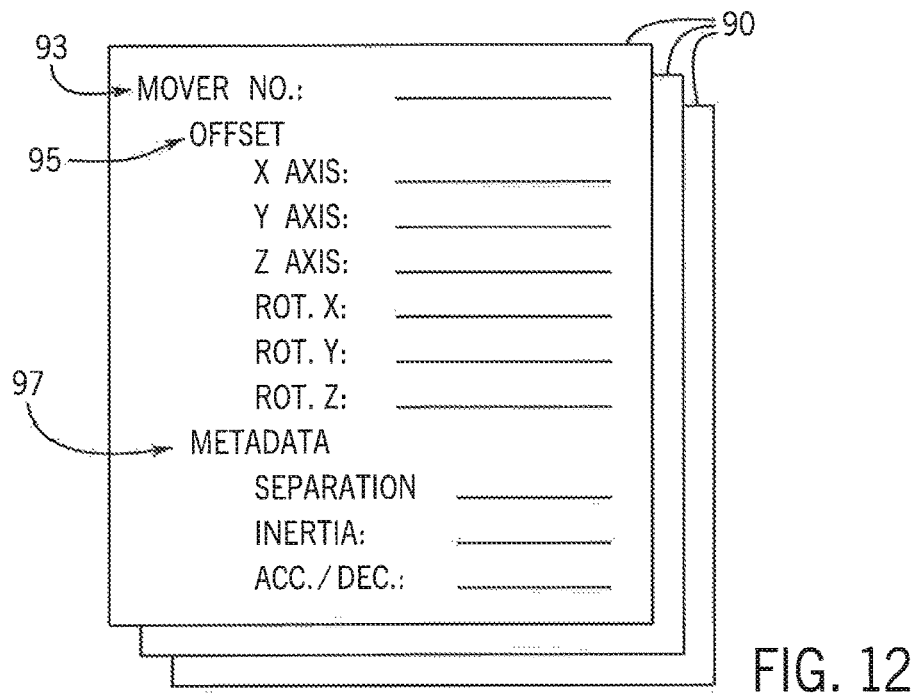
FIG. 12 is a graphical representation of a mover configuration file according to one embodiment of the invention.
FIG. 13 is a tabular representation of a track layout file according to one embodiment of the invention.

Still additional transformations to one, or both, of the motion commands may be performed based on additional configuration files. The coordinate transformer 82 reads each mover configuration file 90, corresponding to the mover 100 that will move in tandem with the external device. As indicated above, the mover configuration fie 90 may include one or more offsets 95, which define a point on the mover 100 at which the desired action is to be performed or an offset due to the presence of a work piece or tool on the mover 100. With reference to FIG. 12, the offset 95 may include multiple components, including a component along each axis, defining a distance along the axis that the point on the mover 100 at which the action is to be performed is displaced from the axis 18 of the track 100. The offset 95 may further include a rotational component for each axis, defining an angle of rotation that exists between the point on the mover 100 at which the action is to be performed and the first coordinate system 160 associated with the track 10. The mover offset 95 may be applied to the transformed motion command for the robot 300 such that the robot 300 knows at what point on the mover 100 it is to interact. The coordinate transformer 82 may further read a configuration file containing an offset for the tool inserted on the robot 300 to obtain an additional offset between the tool tip and the origin of the second coordinate system 170. The tool offset may be applied to the transformed motion command for the robot 300. In one embodiment of the invention, an axis controller on the system controller 30 may directly generate motion signals for motor drives, which, in turn, control operation of the axes of the robot 300. In this embodiment, each of the offsets for both the mover 100 and the robot 300 are stored in the system controller 30.

Optionally, the robot 300 may include an external controller 310 that generates motion signals for the motor drives, which, in turn, control operation of the axes of the robot 300. In this embodiment, the external controller 310 for the robot 300 may store the tool offset and be configured to further transform a position command from the system controller 30 according to offsets stored in memory 314 of the controller 310 on the robot 300. If the controller for the robot 300 manages tool offsets, the coordinate transformer 82 may apply just the offset between the first and second coordinate systems and the offset point on the mover 100 to send a transformed motion command signal, $TP_i$, to the external controller 310 of the robot 300 to achieve the desired interaction between the robot 300 and the mover 100.

In addition to the Cartesian coordinate system 160 defined for the track 10, a track may have a linear position coordinate system defined. As illustrated in FIG. 8, the track 10 includes a track axis 18 extending around the track. In the illustrated track, or in other track arrangements with a single, continuous loop, a starting point along the track axis 18 may be defined as a "zero" or starting position and an increasing linear position is assigned along the length of the track 10 until the track returns to the starting point at which point the linear position returns to zero. In other configurations, the track may include branches or may not return to a starting point. Individual branches may have a new "zero" or starting position or have a unique linear position dedicated to the branch.

Figure 14:
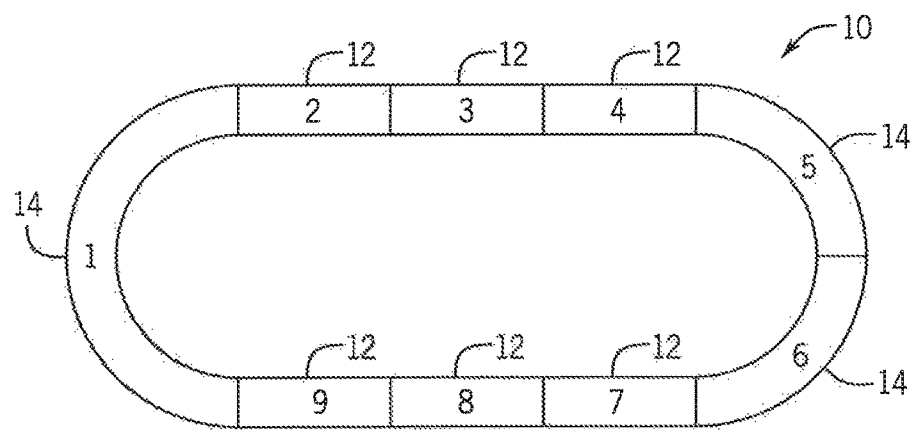
FIG. 14 is a top plan view of an exemplary track layout.

As indicated above, one of the configuration files stored in the memory 60 of the motion controller 30 may be a track layout file 91. The motion controller 30 may utilize the track layout file 92 to convert a motion command in the Cartesian coordinate system 160 to a motion command in the linear position coordinates. With reference to FIG. 13, a portion of an exemplary track layout file 91 that defines, in part, the track 10 shown in FIG. 14, is provided. The track layout file 91 assigns a segment number 270 to each of the segments 12, 14 in the track 10. For each segment, the track layout file 91 further defines a track geometry 271 and a track length 272 for each segment. The track layout file 91 further defines a radius 273 and an angular distance 274 over which each curved segment 14 spans. According to one embodiment of the invention, the linear position of the track 10 begins at zero with the start of the first segment and increases along with the incremental numbering of each track segment. Optionally, the track layout file 91 may further include other fields for each track segment such as a range of linear positions associated with a track segment and the linear position of each track segment is, therefore, defined explicitly in the track layout file 91. It is further contemplated that the track layout file 91 may include additional data such as a field defining a specific linear position to which an origin of a Cartesian coordinate system, such as the first coordinate system 160, corresponds. Optionally, the location of the Cartesian coordinate system may be independently stored in the memory 60 of the motion controller or may be assigned to the zero position of the track 10. Having knowledge of the track layout and a point to which the origin of the Cartesian coordinate system corresponds, locations along the track may be transformed between the Cartesian coordinate system and the linear coordinate system.

Because the track 10 utilizes a linear drive system, motion commands to each of the segment controllers 200 may preferably be transformed to the linear position coordinates prior to transmitting the motion command to each segment controller 200. The coordinate transformer 82 may utilize either the motion command which was generated for each mover 100 in the first coordinate system 160 or a transformed motion command if the coordinated motion command was provided in a coordinate system other than the first coordinate system 160 and the track layout file 91 to transform motion commands to the linear position coordinates. The coordinate transformer 92 reads the geometry of the track and/or the linear positions for the track from the track layout file and generates a full linear position scale for the track. The coordinate transformer 92 then utilizes the commanded position in the motion command and the origin of the first coordinate system 160 to locate the desired position along the track 10 according to the motion command. The coordinate transformer 92 may read the corresponding linear position for the desired position and transform the motion command to a linear position command. The linear position commands may, in turn, be provided to each segment controller 200.

The resulting transformed motion command signals, $TP_i$, are then provided to a segment router 84 which forwards these position values to the appropriate segment controller 200 or robot controller 310. The segment router 84 may include a further configuration file 86 defining addresses for each of the segment controllers 200 or robot controller such that the commands may be transmitted via the communication module 44 to the respective controller.

As previously discussed, each mover 100 may have one or more offsets 95 associated with the mover. With reference again to FIG. 12, the exemplary mover configuration file 90 may further include settings for various metadata 97. According to the illustrated embodiment, the metadata may include a minimum separation distance between two movers 100, an inertia value of the mover 100, or a minimum or maximum acceleration and deceleration rate for the mover 100. While not directly used to transform motion commands between coordinate systems, the metadata 97 may be read by the coordinate transformer 82 and utilized by the coordination subsystem 74 to adjust the motion commands. A desired separation between the given mover and an adjacent mover, for example, may adjust a position and subsequently the motion command provided to a mover 100 according to operation of another mover. The acceleration and deceleration values may define and/or limit the rate at which a motion command may change. Similarly, an inertia value of the mover 100 identifies a weight of the mover 100 and/or a weight carried by the mover 16 beyond its normal weight. The inertia value may be used, for example, to adjust the acceleration and deceleration values as a mover 100 may not be able to change speed as rapidly as the weight of the mover 16 increases. It is contemplated that still other metadata 97 may be stored in the mover configuration file including, but not limited to, a minimum collision avoidance distance or a cluster mover, where multiple movers 100 operate in tandem.

Figure 15:
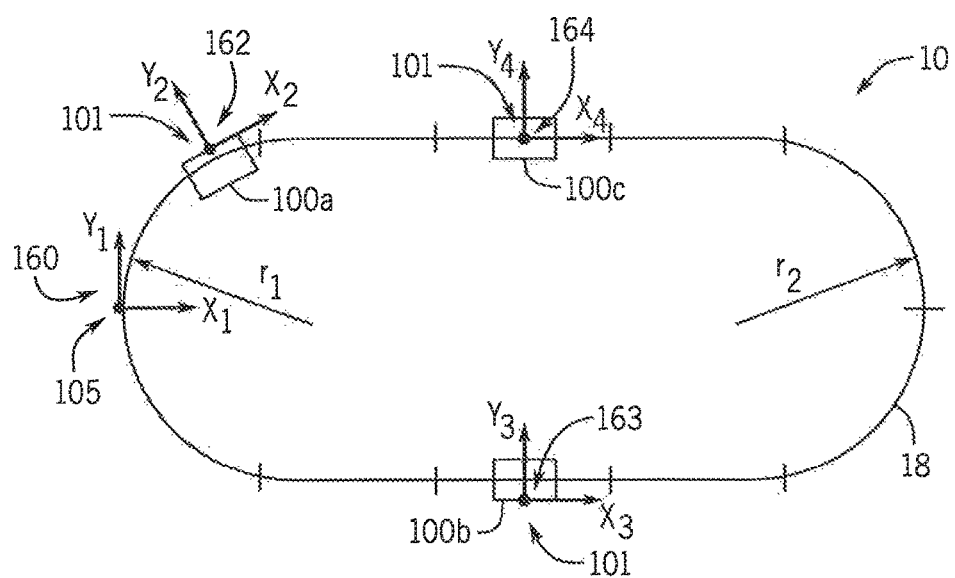
FIG. 15 is a top plan view illustrating relationships between a track axis, movers, and a Cartesian coordinate system associate with the track according to one embodiment of the invention.

It is further contemplated that the data in the mover configuration file 90 may be updated dynamically as a mover 100 travels along the track 10. For example, the inertia value of the mover 100 may change as a workpiece and/or product is added to or removed from the mover 100 as a mover travels along the track 10. With reference to FIG. 15, it is further contemplated that the offset values 95 may change as a mover 100 travels along the track 10. Each mover 100a-100c shown in FIG. 15 may interact with the external device 300 at a point 101 along the outside of the mover 100. As illustrated, the origin of the first coordinate system 160 is located on the surface of the track and on the axis 18 of the track at an origin 105. At the location indicated by the position of the first mover 100a in FIG. 15, the surface of the mover 100 on which the point 101 is located is displaced from the axis 18 and rotated with respect to the orientation of the first coordinate system 160 at the origin 105. A second coordinate system 162 is illustrated with an origin of the second coordinate system located at the point 101 on the mover 100a with which the robot will interact. The offset in the illustrated embodiment may be due solely to the shape of the mover 100. Optionally, the offset may be due to a workpiece and/or a tool attached to the mover 100. The position of the origin of the second coordinate system 162 may be defined by a single offset 95 or by multiple offsets 95, such as a work piece and/or a tool offset. The offset values 95 for the first mover 100a may include values for each axis as well as values for rotation of each axis. At the location indicated by the first mover 100a, an offset may exist in the positive y-axis direction from the track axis 18 with no offset along the x-axis. The z-axis would extend into or from the page and no indication of the location along the z-axis is provided. Further, the point is located along the radius of a curve of the track and rotational offsets in each of the x-axis and y-axis may be applied.

If the first mover 100a travels to the location indicated by the second mover 100b, the point 101 at which the external device is to interact with the mover 100b has rotated to the other side of the track. At the location indicated by the second mover 100b, a third coordinate system 163 with the location of the origin of the coordinate system located at the point 101 on the mover 100b at which the robot will interact. An offset may exist in the negative y-axis direction from the track axis 18 with no offset along the x-axis. The z-axis again would extend into or from the page and no indication of the location along the z-axis is provided. However, the surface on which the point is located is parallel to the axis 18 of the track. As a result, the offset values 95 may include only data for axis offsets while the values for the rotation of each axis may be set to zero. It is contemplated that the motion controller 30 may update the values of the offsets 95 in the mover configuration file 90 for the mover 100 dynamically as it travels along the track 10. As a result, a motion command to the controller for the robot 300 will automatically be transformed such that the robot 300 interacts with the mover 100 at the correct point 101 on the mover 100 as the mover travels along the track 10.

A third mover 100c is also illustrated in FIG. 15. The third mover 100c may have the external device interact with a location on the mover 100c that is directly aligned with the axis 18 of the track 10. Because there is some thickness to the mover 100c, there may be a value in the z axis offset, but the remaining offset values may all be zero. Further, there may be a work piece and/or tool offset 95 that further offsets the point 101 from the surface of the track 18. The configuration file 90 may include a single offset 95 or multiple offsets to define the offset from the track 10 to the point 101 on the mover 100 at which the external device will interact.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for coordinating motion between an external device and at least one mover in a linear drive system, wherein the linear drive system includes a track along which each mover travels, the method comprising the steps of:
    defining a first coordinate system in a motion controller, wherein the first coordinate system corresponds to one of the external device and the track;
    defining a second coordinate system in the motion controller, wherein the second coordinate system corresponds to one of the external device and the track and wherein each of the external device and the track are defined by one of the first and the second coordinate systems;
    storing a coordinate system offset in a memory of the motion controller, wherein the coordinate system offset is an offset between the first coordinate system and the second coordinate system;
    receiving a coordinated motion command for the external device at the motion controller, wherein the coordinated motion command identifies the at least one mover to move in tandem with the external device;
    generating a first motion command at the motion controller from the coordinated motion command, wherein the first motion command defines motion for the at least one mover in the first coordinate system;
    generating a second motion command at the motion controller from the coordinated motion command, wherein the second motion command defines motion for the external device in the first coordinate system;
    generating a transformed motion command at the motion controller by transforming one of the first motion command and the second motion command to the second coordinate system in the motion controller as a function of the coordinate system offset; and
    controlling operation of the external device and the at least one mover as a function of the transformed motion command and of the first or second motion command that was not transformed to the second coordinate system.

2. The method of claim 1 wherein:
    the first coordinate system corresponds to the track,
    the second coordinate system corresponds to the external device,
    the second motion command is transformed by the coordinate system offset to the transformed motion command, and
    the first motion command is used to control operation of the at least one mover.

3. The method of claim 2 wherein the track includes a plurality of segments, the method further comprising the steps of:
    generating a plurality of segment motion commands in the motion controller, wherein each segment motion controller is generated as a function of the first motion command;
    transmitting each of the plurality of segment motion commands to a segment controller in one of the plurality of segments of the linear drive system; and
    controlling operation of the at least one mover at each segment along the track according to the segment motion command received by the corresponding segment controller.

4. The method of claim 2 further comprising the step of transforming the first motion command to a linear motion command, wherein the linear motion command corresponds to a distance along the track.

5. The method of claim 1 wherein:
    the first coordinate system corresponds to the track,
    the second coordinate system corresponds to the external device,
    the first motion command is transformed by the coordinate system offset to the transformed motion command, and
    the second motion command is used to control operation of the external device.

6. The method of claim 5 wherein the track includes a plurality of segments, the method further comprising the steps of:
    generating a plurality of segment motion commands in the motion controller, wherein each segment motion controller is generated as a function of the transformed motion command;
    transmitting each of the plurality of segment motion commands to a segment controller in one of the plurality of segments of the linear drive system; and
    controlling operation of the at least one mover at each segment along the track according to the segment motion command received by the corresponding segment controller.

7. The method of claim 1 further comprising the steps of:
    identifying a mover configuration file for the at least one mover, wherein each mover configuration file corresponds to one of the at least one movers and is stored in the motion controller;
    obtaining a mover offset for each of the at least one movers from the corresponding mover configuration file; and
    adding the mover offset to the second motion command in the first coordinate system.

8. The method of claim 1 wherein the step of controlling operation of the external device further comprises the step of transmitting one of the second motion command and the transformed motion command to an external controller, wherein the external controller is operative to drive the external device.

9. The method of claim 8 further comprising the steps of:
obtaining at least one additional offset with the external device, wherein the at least one additional offset is stored in a memory of the external controller, and
transforming the second motion command or the transformed motion command to an external motion command as a function of the additional offset.

10. An apparatus for coordinating motion between an external device and at least one mover in a linear drive system, wherein the linear drive system includes a plurality of segments, the apparatus comprising:
a motion controller having:
a memory operative to store a first coordinate system, a second coordinate system, a coordinate system offset between the first and second coordinate systems, and at least one control program;
a processor operative to execute the control program to:
receive a coordinated motion command for the external device and the at least one mover;
generate a first motion command from the coordinated motion command defining motion for the at least one mover in the first coordinate system;
generate a second motion command from the coordinated motion command defining motion for the external device in the first coordinate system;
transform the second motion command from the first coordinate system to the second coordinate system as a function of the coordinate system offset;
transmit the transformed second motion command to an external controller, wherein the external controller is operative to control the external device; and
transmit the first motion command to a plurality of segment controllers; and
the plurality of segment controllers wherein each of the plurality of segment controllers is operative to drive the at least one mover along one of the plurality of segments.

11. The apparatus of claim 10 wherein:
the memory is further operative to store a track layout, and
the processor is further operative to transform the first motion command from the first coordinate system to a linear motion command as a function of the track layout and to transmit the linear motion command to the plurality of segment controllers.

12. The apparatus of claim 10 wherein:
the memory is further operative to store a plurality of mover configuration files, and
the processor is further operative to:
identify the mover configuration file corresponding to each of the at least one movers;
obtain a mover offset for each of the at least one movers from the corresponding mover configuration file; and
add the mover offset to the second motion command in the first coordinate system.

13. The apparatus of claim 12 wherein each of the plurality of mover configuration files includes at least one metadata value defining, at least in part, motion of the at least one mover and wherein the processor is further operative to:

obtain the at least one metadata value for the mover, and
generate the first motion command as a function of the coordinated motion command and of the at least one metadata value.

14. The apparatus of claim 10 wherein the external controller includes a memory storing at least one additional offset and the external controller is operative to control the external device as a function of the transformed second motion command and of the at least one additional offset.

15. A method for coordinating motion between an external device and at least one mover in a linear drive system, wherein the linear drive system includes a track along which each mover travels, the method comprising the steps of:
defining a first coordinate system in a motion controller, wherein the first coordinate system corresponds to the track;
defining a second coordinate system in the motion controller, wherein the second coordinate system corresponds to the external device;
storing a coordinate system offset in a memory of the motion controller, wherein the coordinate system offset is an offset between the first coordinate system and the second coordinate system;
receiving a coordinated motion command for the external device at the motion controller, wherein the coordinated motion command defines at least one mover to move in tandem with the external device;
generating a first motion command at the motion controller from the coordinated motion command, wherein the first motion command defines motion for the at least one mover in the first coordinate system;
generating a second motion command at the motion controller from the coordinated motion command, wherein the second motion command defines motion for the external device in the first coordinate system;
generating a transformed motion command at the motion controller by transforming the second motion command to the second coordinate system in the motion controller as a function of the coordinate system offset; and
controlling operation of the at least one mover and of the external device as a function of the first motion command and of the transformed motion command.

16. The method of claim 15 further comprising the steps of:
storing a track layout in the memory; and
transforming the first motion command from the first coordinate system to a linear motion command as a function of the track layout, wherein operation of the at least one mover is controlled as a function of the linear motion command.

17. The method of claim 15 further comprising the steps of:
identifying a mover configuration file stored in the memory, wherein each mover configuration file corresponds to one of the at least one movers;
obtaining a mover offset for each of the at least one movers from the corresponding mover configuration file; and
adding the mover offset to the second motion command in the first coordinate system.

18. The method of claim 17 wherein each of the plurality of mover configuration files includes at least one metadata value defining, at least in part, motion of the at least one mover and wherein the method further comprises the steps of:

obtaining the at least one metadata value for the mover, and generating the first motion command as a function of the coordinated motion command and of the at least one metadata value.

19. The method of claim 15 wherein:

an external controller controls operation of the external device, the external controller includes a memory storing at least one additional offset, and the external controller is operative to control the external device as a function of the transformed second motion command and of the at least one additional offset.

\* \* \* \* \*